Jan. 12, 1960 R. HERBRECHT 2,920,382
APPARATUS FOR PLACING WINDINGS IN MOTOR STATORS
Filed June 15, 1954 3 Sheets-Sheet 1

Jan. 12, 1960 R. HERBRECHT 2,920,382
APPARATUS FOR PLACING WINDINGS IN MOTOR STATORS
Filed June 15, 1954 3 Sheets-Sheet 3

United States Patent Office 2,920,382
Patented Jan. 12, 1960

2,920,382
APPARATUS FOR PLACING WINDINGS IN MOTOR STATORS

René Herbrecht, Paris, France, assignor to Societe Anonyme dite: Compagnie Electro-Mecanique, Paris, France Application June 15, 1954, Serial No. 436,907

Claims priority, application France June 17, 1953

3 Claims. (Cl. 29—205)

The present invention relates in general to electric motors and the like, and is concerned more particularly with the problem of fitting the windings in the slots of stators and rotors of electrical machinery.

It is known that the operation of fitting windings in electrical machinery, whether on the stator or the rotor is attended by many difficulties, of which the chief one consists in harmonizing the advantage of utilizing open slots, or slots having relatively wide or outflaring inlet apertures for faiclitating the insertion of the wires, with the tendency of these wires, when positioned in the slots, to escape therefrom due to the pressure exerted on other parts of the winding. As a rule, this difficulty is overcome by temporarily "wedging" the wires in the slots as the latter are filled with the required amount of coil wires, and subsequently providing a permanent fixation of these wires upon completion of the winding or coil-fitting operation. However, this conventional procedure results in a substantial loss of time. Moreover, the operation is particularly difficult when it is desired to wind dummy-rotors of winding machines, as already described in the U.S. Patent No. 2,506,173, issued May 2, 1950, especially in view of the fact that these machines utilize dummy-rotors having deep, narrow slots which necessarily have parallel sides.

Now it is the principal object of this invention to provide a novel apparatus for accomplishing the winding operation, which is characterized in that the wires are maintained in the already filled slots, during the winding operation, by a device adapted to be mounted concentrically on the rotor or stator and used as an outer retaining collar. Thus, the temporary wire packing which was currently employed up to now can be dispensed with, the permanent packing alone being effected upon completion of the winding operation. In the specific case of dummy-rotors of winding machines, it is even possible to dispense completely with this permanent packing operation, as the device according to this invention is kept on the dummy-rotor during the intermediate handling thereof until the dummy-rotor is inserted into the winding machine.

The attached drawings forming part of this specification illustrate diagrammatically by way of example the manner in which the invention may be carried out in the practice. In the drawings.

Figure 1:
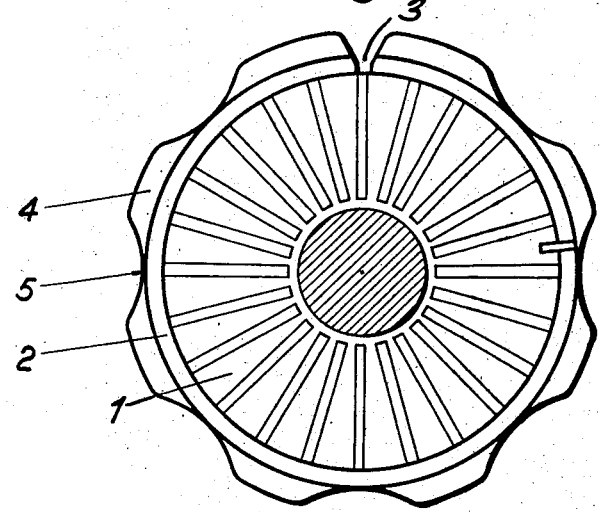
Figs. 1 and 2 are an end view and a plan view with fragmentary section, respectively, showing one form of embodiment of a device for carrying out the method of this invention, and applicable more particularly to the winding of dummy-rotors.

The device according to the invention is shown generally at 2 and is of substantially cylindrical, sleevelike shape; it is dimensioned to fit concentrically over the dummy rotor 1 and adapted to be rotated thereon. Along one generatrix of this sleeve member a slit or slot 3 is formed; the width of the slit 3 is at least equal to that of a dummy-rotor slot but smaller than the width of a tooth or solid interval between adjacent slots. The axial length of the sleeve 2 may be equal to or slightly less than that of the dummy-rotor, according to the method employed for centering the dummy-rotor in the stator, so as to free the positioning lugs provided at the ends of the stator. The sleeve 2 is provided at one end with an outer flange 4 having cut spaced lunular notches 5 therein to facilitate the gripping of the device by the operator for rotating it about its axis.

Finally, the opposite end of the device may be provided or not with a bevelled portion 6 according to the type of tools utilized for inserting the dummy-rotor into the stator.

When a dummy-rotor is being wound according to the methods disclosed in the aforesaid patent, the slot in which the coil portion is to be inserted during the handlings is uncovered by bringing the slit 3 into radial alignment with this slot. When the winding is properly positioned in the slot, the sleeve 2 is rotated through the angle required for causing its slit 3 to register with the next slot to be filled with winding wires, during the winding operation. Thus, the previously wound slot is closed completely and the wires cannot escape therefrom.

When all the slots of the dummy-rotor have been wound, the slit 3 is stopped in alignment with the tooth 12 carrying the dummy-rotor centering lug 13. As the dummy-rotor is pushed axially into the stator, the sleeve will be able to move freely in the axial direction on the dummy-rotor and to be released progressively by abutting either the stator plates or a suitable tool or jig, while maintaining the wires in their relevant slots as long as the dummy-rotor is not engaged completely in the stator.

From the foregoing it is apparent that a sleeve of the type forming the subject-matter of this invention may be utilized for winding any rotors for both D.C. and A.C. machines, whether of the open- or half-closed slot type.

Figure 2:
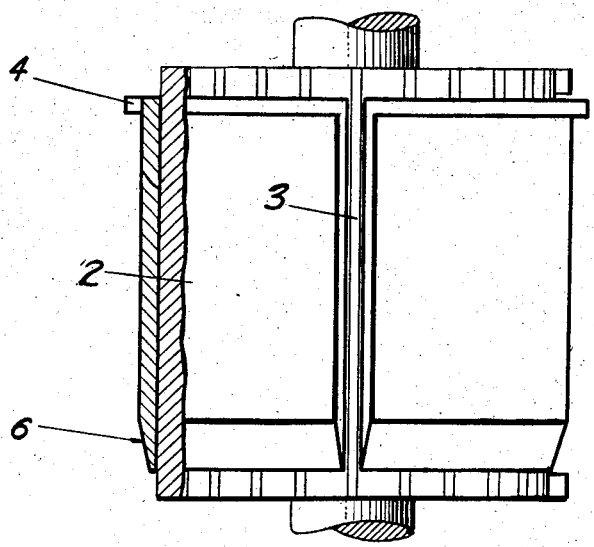
Figure 3:
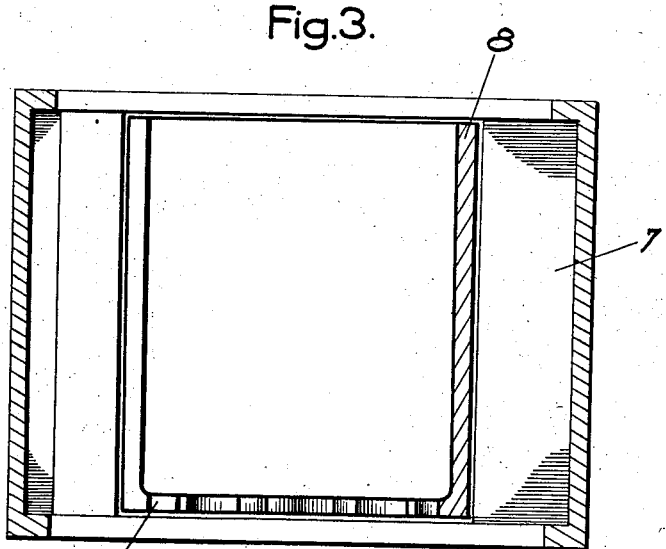
Figs. 3 and 4 are similar views showing a modified embodiment applicable more particularly to the winding of a stator of an electrical machine.
Figure 4:
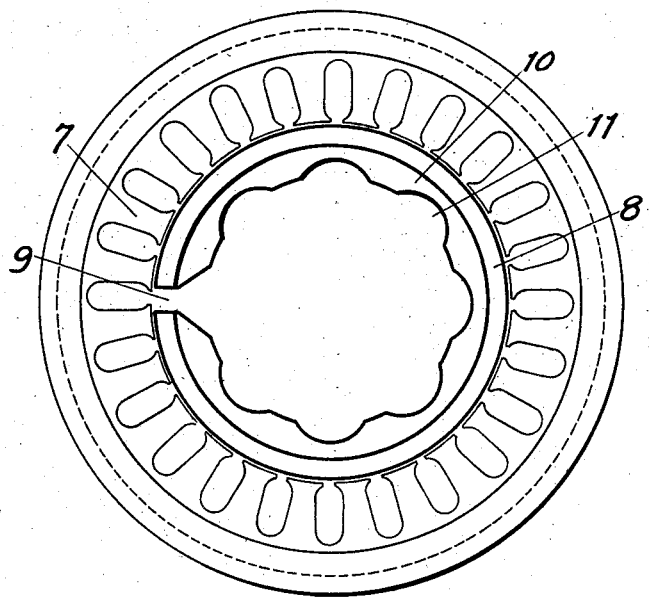
Figure 5:
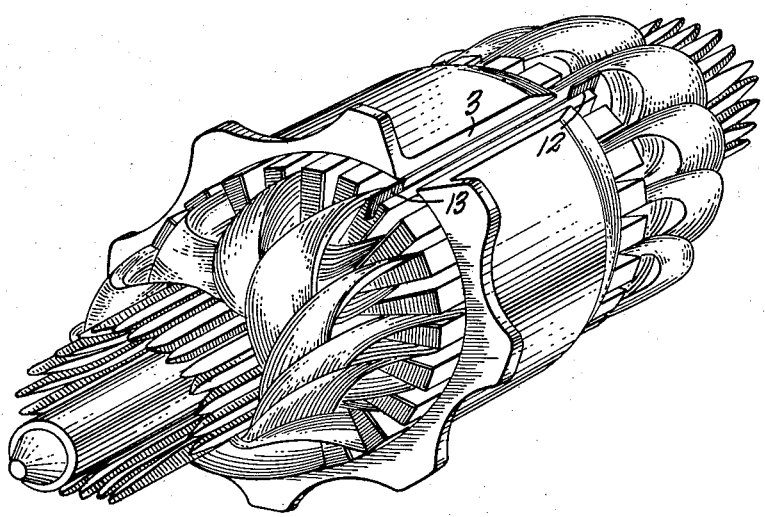
Fig. 5 is a perspective view of the apparatus and a dummy-rotor in assembled condition and is illustrative of the condition of the apparatus prior to insertion axially in a stator.

In the embodiment illustrated in Figs. 3 and 4 of the drawings, the sleeve 8 formed with a slit 9 is disposed internally of a stator 7. The sleeve 8 is formed with an inner flange 10 also provided with spaced lunular notches 11 to facilitate the rotation of the sleeve about its axis. The sleeve according to this modified embodiment is used as that described in connection with Figs. 1 and 2 of the drawings and designed for winding rotors. When the winding operation proper is completed, the slot-closing members are fitted and the sleeve left in position until the winding wires are properly set and packed in all the slots. Thus, the winding-fitting operation is performed in one continuous step, thereby reducing to a substantial extent the time required for its accomplishment.

While the above description and the accompanying drawings refer but to two winding operations carried out by means of the device of the invention on a rotor and stator, respectively, it will be readily understood that many details as to size, proportions and materials of this device may be varied to suit specific conditions of operation, without however departing from the spirit and scope of the invention.

What I claim is:

1. Apparatus to hold coils in slots in a false rotor while winding the coils on the rotor and for holding the coils from shifting radially in the false rotor when transferring the coils from the false rotor slots into related slots of a stator comprising in combination with a false rotor, a cylindrical, elongated, sleeve element positionable circumferentially of the false rotor extending substantially the full axial length of said rotor and dimensioned to fit concentrically over the rotor for rotation thereon, the sleeve element having a slot extending longitudinally the full length of the sleeve element, said slot having a width at least equal to the width of each of said rotor slots, a flange portion at one end of the sleeve for manually rotating the sleeve element around the false rotor at will thereby to align the slot on the sleeve with corresponding individual slots on the rotor when winding coils on the rotor and for displacing the sleeve element circumferentially once a coil has been wound on the rotor so that it is held in position and cannot move radially outward from the false rotor.

2. Apparatus to hold coils in slots in a false rotor while winding the coils on the rotor and for holding the coils from shifting radially in the false rotor when transferring the coils from the false rotor slots into related slots of a stator comprising, in combination with a false rotor, a cylindrical, elongated sleeve element positionable circumferentially of the false rotor extending longitudinally on the rotor a distance slightly less than the axial length of the rotor and dimensioned to fit concentrically over the rotor for rotation thereon, the sleeve element having a slot extending the full length of the sleeve element, said slot having a width at least equal to the width of each of said rotor slots and less than a distance corresponding to the distance between next successive slots on the rotor, a flange portion at one end of the sleeve having notches for manually rotating the sleeve element around the false rotor at will thereby to align the slot on the sleeve with corresponding individual slots on the rotor when winding coils on the rotor and for displacing the sleeve element circumferentially once a coil has been wound on the rotor so that it is held in position and cannot move radially outward from the false rotor, and the sleeve having an overall diameter so dimensioned that it is positionable axially of the stator.

3. Apparatus to hold coils in slots in a false rotor while winding the coils on the rotor and for holding the coils from shifting radially in the false rotor when transferring the coils from the false rotor slots into related slots of a stator comprising, in combination with a false rotor, a cylindrical, elongated sleeve element positionable circumferentially of the false rotor extending substantially the full axial length of said rotor and dimensioned to fit concentrically over the rotor for rotation thereon, the sleeve element having a slot extending longitudinally the full length of the sleeve element, said slot having a width at least equal to the width of each of said rotor slots, a flange portion at one end of the sleeve provided with notches for manually rotating the sleeve element around the false rotor at will thereby to align the slot on the sleeve with corresponding individual slots on the rotor when winding coils on the rotor and for displacing the sleeve element circumferentially once the coils have been wound on the rotor so that it is held in position and cannot move radially outward from the false rotor, and the sleeve element having a tapered peripheral end portion at the end opposite to the flange portion, and an overall diameter so dimensioned that it is positionable axially of the stator.

References Cited in the file of this patent

UNITED STATES PATENTS

| 273,621 | Small | Mar. 6, 1883 |
| 1,431,947 | Gysel | Oct. 17, 1922 |
| 1,479,248 | Moore | Jan. 1, 1924 |
| 1,538,187 | Herrick | May 19, 1925 |
| 2,506,173 | Polard | May 2, 1950 |

FOREIGN PATENTS

| 379,589 | Great Britain | Sept. 1, 1932 |